(No Model.) 2 Sheets—Sheet 1.
J. W. DOUGLAS.
CUTTER AND HOLDER FOR LATHES.
No. 280,146. Patented June 26, 1883.
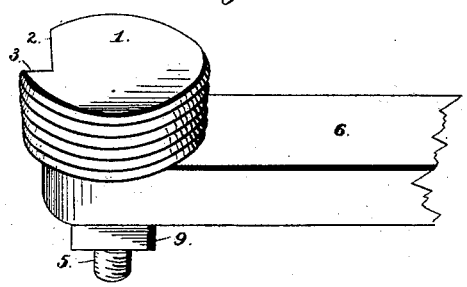
Fig. 1.
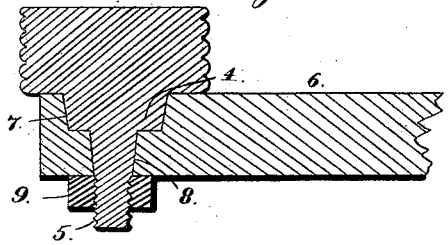
Fig. 2.
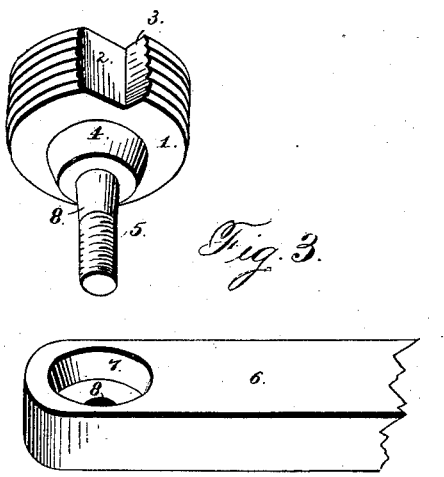
Fig. 3.
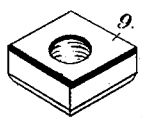
Witnesses:
Jas. E. Hutchinson
J. A. Rutherford
Inventor:
Jos. W. Douglas,
By James L. Norris.
Atty.

(No Model.) 2 Sheets—Sheet 2.
J. W. DOUGLAS.
CUTTER AND HOLDER FOR LATHES.
No. 280,146. Patented June 26, 1883.
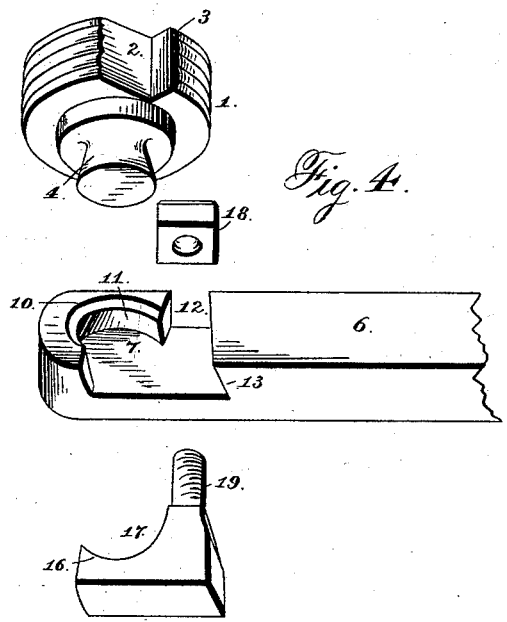
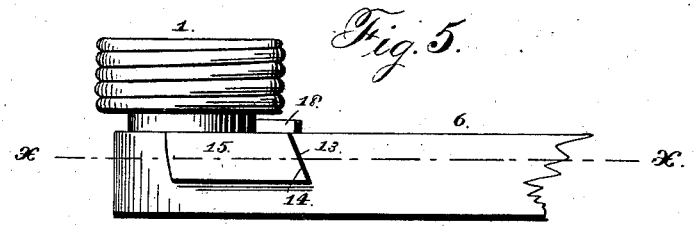
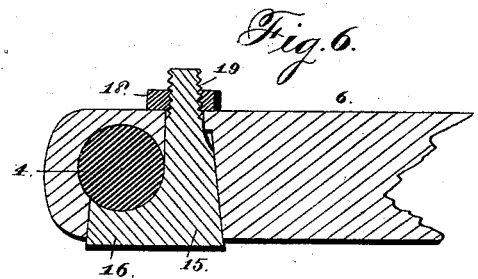
Witnesses:
Jas. E. Hutchinson.
J. A. Rutherford
Inventor.
Jos. W. Douglas,
By James L. Norris.
Atty.

UNITED STATES PATENT OFFICE.

JOSEPH W. DOUGLAS, OF MIDDLETOWN, CONNECTICUT.

CUTTER AND HOLDER FOR LATHES.

SPECIFICATION forming part of Letters Patent No. 280,146, dated June 26, 1883.

Application filed March 24, 1883. (No model.)

*To all whom it may concern:*

Be it known that I, JOSEPH W. DOUGLAS, a citizen of the United States, residing at Middletown, in the county of Middlesex and State of Connecticut, have invented new and useful Improvements in Cutters and Holders for Lathes, Planers, and Similar Machines, of which the following is a specification.

This invention relates to improvements in circular notched cutters for planers, lathes, and similar machines, and has for its objects to provide novel and efficient means for connecting the circular cutter with its holding or carrying bar, without the necessity of drilling or otherwise forming an opening centrally through the cutter for the passage of a clamping-bolt, and to provide novel means for clamping and holding the cutter in a fixed position on its holding or carrying bar, so that the cutting-bit formed by the transverse notch is retained in the same relative position, unless intentionally adjusted, when the cutting-bit becomes worn.

The objects of my invention I accomplish by forming the circular notched cutter integral with a laterally-projecting shank at one of its sides, which is arranged within a socket or recess formed in one side of the holding-bar, combined with suitable devices for drawing or clamping the said shank into the socket or recess of the bar, whereby the cutter is immovably attached by simple but substantial means.

The invention also consists of certain features of construction and combination, which are hereinafter described and claimed, and illustrated in the accompanying drawings, in which—

Figure 1 represents a perspective view with a portion of the holding-bar broken away; Fig. 2, a longitudinal central sectional view through the centers of the cutter and the holding-bar; Fig. 3, perspective views of the parts detached; Fig. 4, perspective views of the parts detached, showing a modification of my invention; Fig. 5, an edge view of the parts shown in Fig. 4 connected together, and Fig. 6 a longitudinal transverse sectional view on the line $x$ $x$ of Fig. 5.

The circular cutter No. 1 is provided with a transverse notch or recess, 2, to form the cutting-bit 3, and the periphery of the cutter is constructed to produce any form of cut that may be desired—such, for example, as with threads to form screw-threads, or with a single annularly-projecting cutter to form a groove or slot, or with a cutting-face to shave, plane, or turn.

Referring to Figs. 1, 2, and 3, the circular cutter is formed integral with a laterally-projecting tapering shank, 4, having at its outer smallest end an attached screw-threaded stem, 5, and the end of the cutter-holding bar 6 is formed or otherwise provided with a tapering socket, 7, and an orifice or opening, 8, all in such manner that the threaded stem and tapering shank of the cutter can be inserted, respectively, into the orifice or opening of the holding-bar, and a nut, 9, then screwed upon the threaded stem and against the bar, whereby the shank of the cutter will be tightly drawn into the socket or recess of the bar, toward the inner wall of the socket, to substantially connect the parts and effectually prevent the cutter from rotating while operating on the rotating or moving work. The shank on the cutter and the wall of the socket in the bar are circular in form, so that the cutter can be accurately and nicely adjusted around its axis, when necessary, by reason of the cutting-bit wearing away.

Referring to Figs. 4, 5, and 6, the circular cutter 1 is formed integral with the tapering shank 4; but in this instance the smallest end of the shank is where it joins the face of the cutter, so that the diameter of the shank uniformly increases in an outer direction. The socket in the holding-bar must of course be constructed to conform to the reversed taper of the shank, and to this end the wall 10 of the socket is inclined, as at 11. The holding-bar is cut away to form a recess, 12, at the inner end of the wall 10 of the socket, and, further, the bar is recessed to form a downward-inclined transverse wall or shoulder, 13, to receive the wedge-shaped edge 14 of clamping-block 15. This block accurately fits into the recess of the bar, and is provided with a semi-circular arm, 16, having an inclined inner edge, 17, which is for the purpose of opposing the tapering form of the cutter-shank, and draw or force the inner end of the latter toward or against the inner wall of the socket 7 when the clamping-block is adjusted transversely through the holding-bar upon the cutter-shank, through the medium of a clamping-nut, 18, which screws upon a threaded stem, 19, secured to the clamping-block and projecting through the recess 12 of the bar. In this construction the inclined wall 13 and wedge-shaped edge 14 retain the clamping-block accurately in position and prevent its moving laterally away from the holder.

I am aware that tools for turning metal have been made with a lateral tapering shank to fit into a corresponding recess in the side of the tool-holder. This, therefore, I do not claim; but What I do claim, and desire to secure by Letters Patent, is—

1. The combination of the circular notched cutter having projecting shank and a central threaded stem, both of which are solid with said cutter and upon the same side, a holding-bar having a socket in its side, within which the shank fits, and a clamping-nut for holding the cutter in place and drawing its shank toward the inner wall of the socket, substantially as described.

2. The combination of the circular notched cutter having a circular tapering shank and a central threaded stem, both of which are solid with said cutter and upon the same side, a holding-bar having a socket in its side, within which the shank fits, and a clamping-nut for holding the cutter in place and drawing its shank toward the inner wall of the socket, substantially as described.

In testimony whereof I have hereunto set my hand in the presence of two subscribing witnesses.

JOS. W. DOUGLAS.

Witnesses:
JOHN N. CAMP,
E. G. CAMP.